United States Patent
Soda

(10) Patent No.: US 11,015,998 B2
(45) Date of Patent: May 25, 2021

(54) SYSTEM AND METHOD FOR SUPERVISING, MANAGING, AND MONITORING THE STRUCTURAL INTEGRITY OF A FLUID-TRANSPORTATION PIPELINE NETWORK, FOR LOCATING THE LEAKING POINT, AND FOR EVALUATING THE EXTENT OF THE FAILURE

(71) Applicant: PIPE MONITORING CORPORATION SRL, Rome (IT)

(72) Inventor: Giuseppe Soda, Castroregio (IT)

(73) Assignee: PIPE MONITORING CORPORATION SRL, Rome (IT)

( * ) Notice: Subject to any disclaimer, the term of this patent is extended or adjusted under 35 U.S.C. 154(b) by 646 days.

(21) Appl. No.: 14/650,845

(22) PCT Filed: Dec. 11, 2013

(86) PCT No.: PCT/IT2013/000346
§ 371 (c)(1),
(2) Date: Jun. 9, 2015

(87) PCT Pub. No.: WO2014/091513
PCT Pub. Date: Jun. 19, 2014

(65) Prior Publication Data
US 2015/0308917 A1    Oct. 29, 2015

(30) Foreign Application Priority Data
Dec. 11, 2012 (IT) .............................. RM2012A0629

(51) Int. Cl.
*G01M 3/24* (2006.01)
*G01M 3/18* (2006.01)
(Continued)

(52) U.S. Cl.
CPC ............ *G01M 3/243* (2013.01); *G01M 3/002* (2013.01); *G01M 3/16* (2013.01); *G01M 3/18* (2013.01);
(Continued)

(58) Field of Classification Search
None
See application file for complete search history.

(56) References Cited

U.S. PATENT DOCUMENTS 6,155,292 A     12/2000  Kurata
7,456,736 B2 *  11/2008  Primm ............. G08B 13/19656
                                                        340/3.1
(Continued)

FOREIGN PATENT DOCUMENTS

CN      201569549      9/2010
CN      102444786      5/2012

OTHER PUBLICATIONS

Mohamed and Jawhal, "A Fault Tolerant Wired/Wireless Sensor Network Architecture for Monitoring Pipeline Infrastructures", Aug. 25-31, 2008, IEEE, 2008 Second International Conference on Sensor Technologies and Applications (sensorcomm 2008), pp. 179-184.*

(Continued)

*Primary Examiner* — Brent A. Fairbanks
(74) *Attorney, Agent, or Firm* — Nixon & Vanderhye

(57) ABSTRACT

A system and method for supervising, managing, and monitoring the structural integrity of a network of metal pipelines for transporting a fluid, for locating the leaking point, and for evaluating the fault or failure, comprising a plurality of detection units (1) positioned on a pipeline (2) for oil or gas at a distance apart by a given value and fixedly applied to the pipeline (2), and a central data-processing unit (4) connected by means of communication lines (5) to said detection units
(Continued)

(1) for receiving from the latter detection data, wherein said units (1) comprise sensors capable of measuring one or more physical quantities, wherein said processing unit (4) processes in real time the detection data received from the detection units (1).

15 Claims, 5 Drawing Sheets

(51) Int. Cl.
  *G01M 3/00* (2006.01)
  *G01M 3/28* (2006.01)
  *G01M 3/16* (2006.01)
  *G01M 3/38* (2006.01)

(52) U.S. Cl.
  CPC ........ *G01M 3/2807* (2013.01); *G01M 3/2815* (2013.01); *G01M 3/38* (2013.01)

(56) References Cited

U.S. PATENT DOCUMENTS

| | | | | |
|---|---|---|---|---|
| 2003/0079553 | A1* | 5/2003 | Cain | G01M 3/002 |
| | | | | 73/861.27 |
| 2006/0290779 | A1* | 12/2006 | Reverte | F16L 55/32 |
| | | | | 348/84 |
| 2007/0041333 | A1* | 2/2007 | Twitchell, Jr. | F17D 5/06 |
| | | | | 370/252 |
| 2007/0206521 | A1* | 9/2007 | Osaje | G01D 4/004 |
| | | | | 370/315 |
| 2009/0003760 | A1* | 1/2009 | Stoesz | G01K 11/3206 |
| | | | | 385/13 |
| 2009/0322544 | A1* | 12/2009 | McDowell | G01M 3/2815 |
| | | | | 340/605 |
| 2010/0023303 | A1* | 1/2010 | Smith | F17D 5/00 |
| | | | | 702/188 |
| 2012/0007743 | A1 | 1/2012 | Solomon | |
| 2013/0147962 | A1* | 6/2013 | Siann | H04L 67/12 |
| | | | | 348/159 |
| 2014/0136140 | A1* | 5/2014 | Chan | G01H 17/00 |
| | | | | 702/141 |

OTHER PUBLICATIONS

Yu, Huaping, Guo, Mei, "An Efficient Oil and Gas Pipeline Monitoring Systems based on Wireless Sensor Networks," Yangtze University, Jingzhou, People's Republic of China, IEEE 97-1-4673-2588 (Feb. 12, 2012).

Dalbro, Martin, Eikeland, Erik, Int'veld, Aart Joakim, Gjessing, Stein, Lande, Tor Sverre, RILS, Havard Kolle, Sorasen, Oddvar, "Wireless sensor networks for off-shore oil and gas installations," Department of Informatics, Univ. of Oslo, Oslo, Norway, IEEE 978-0-7695-3330 (Aug. 8, 2008).

Chinese Office Action dated Jan. 17, 2018 in corresponding Chinese Patent Application No. 201380064650.6 with English translation of Chinese Office Action.

Yang Shiying, "Research of Pipeline Leak Monitoring Technology Based on Wireless Sensor Network", Dissertation for the Master Degree in Engineering, Yanshan University, English abstract, Sep. 15, 2011, 77 pages.

Lu Anjun, "Study on the Method of Detection and Location of Ship Pipeline Leakage", academic dissertation, English abstract, Sep. 28, 2011, 86 pages.

* cited by examiner

| id | sid | rpyroll | rpypitch | rpyyaw | qq0 | qq1 | qq2 | qq3 |
|---|---|---|---|---|---|---|---|---|
| 7641573 | 9 | -39.896 | -78.089 | -138.615 | -0.0569221 | 0.647559 | -0.038647 | 0.758903 |
| 7642004 | 6 | -350.414 | -854.701 | 249.966 | 0.7280380 | -0.0758358 | -0.6796450 | -0.0478743 |
| 7642005 | 6 | -351.605 | -854.767 | 251.082 | 0.7279720 | -0.0759108 | -0.6797060 | -0.0478935 |
| 7641574 | 9 | -422.889 | -779.797 | -136.321 | -0.0590126 | 0.649006 | -0.0419448 | 0.75733 |
| 7641575 | 9 | -421.829 | -779.566 | -136.39 | -0.0592512 | 0.648808 | -0.0417332 | 0.757493 |
| 7642006 | 6 | -352.805 | -855.218 | 252.158 | 0.7277090 | -0.0758955 | -0.6799780 | -0.0480618 |
| 7642007 | 6 | -357.186 | -855.252 | 255.013 | 0.7275200 | -0.0769724 | -0.6800020 | -0.0488591 |
| 7641576 | 9 | -479.624 | -790.191 | -130.847 | -0.0580309 | 0.659045 | -0.0434028 | 0.748604 |
| 7641577 | 9 | -482.151 | -790.653 | -130.603 | -0.0579563 | 0.659481 | -0.0434367 | 0.748224 |
| 7642008 | 6 | 475.063 | -870.006 | -571.028 | 0.7157030 | -0.0444836 | -0.6930710 | -0.0737708 |
| 7642009 | 6 | 878.981 | -877.188 | -978.203 | 0.7036160 | -0.0470801 | -0.7050200 | -0.0751972 |
| 7641578 | 9 | -479.437 | -785.965 | -130.775 | -0.0605522 | 0.657092 | -0.0448145 | 0.750036 |
| 7641579 | 9 | -480.895 | -786.288 | -130.629 | -0.0605213 | 0.657377 | -0.0447836 | 0.749791 |
| 7642010 | 6 | 149.081 | -863.604 | -158.457 | 0.6842430 | -0.0478344 | -0.7245290 | -0.0676841 |
| 7642011 | 6 | 151.058 | -859.948 | -160.419 | 0.6817910 | -0.0475132 | -0.7268460 | -0.0678200 |
| 7641580 | 9 | -483.539 | -782.615 | -130.371 | -0.0623943 | 0.65591 | -0.0467353 | 0.750803 |
| 7642490 | 9 | -483.667 | -782.708 | -130.366 | -0.0623103 | 0.655962 | -0.0467478 | 0.750763 |
| 7642012 | 6 | -132.718 | -862.495 | 123.428 | 0.6901380 | -0.0754491 | -0.7186750 | -0.0390182 |
| 7642013 | 6 | -134.139 | -861.676 | 124.841 | 0.6893500 | -0.0755273 | -0.7194230 | -0.0390326 |
| 7642491 | 9 | -521.998 | -781.579 | -126.669 | -0.0650152 | 0.659163 | -0.0511347 | 0.747437 |
| 7642014 | 6 | -138.084 | -87.346 | 128.459 | 0.6932010 | -0.0712295 | -0.7156490 | -0.0473838 |
| 7642492 | 9 | -525.206 | -781.875 | -126.352 | -0.0650946 | 0.659615 | -0.0512549 | 0.747023 |
| 7642015 | 6 | -139.08 | -872.956 | 129.442 | 0.6927650 | -0.0713355 | -0.7160570 | -0.0474345 |
| 7642493 | 9 | -509.338 | -780.056 | -127.864 | -0.0652212 | 0.657242 | -0.0504707 | 0.749154 |
| 7642494 | 9 | -511.265 | -780.231 | -127.672 | -0.0652901 | 0.657515 | -0.0505411 | 0.748904 |
| 7642016 | 6 | -69.51 | -88.559 | 598.275 | 0.7083320 | -0.0677074 | -0.7007250 | -0.0516360 |
| 7642017 | 6 | -681.975 | -885.563 | 58.52.00 | 0.7085250 | -0.0676041 | -0.7005360 | -0.0516791 |
| 7642495 | 9 | -527.364 | -778.682 | -126.116 | -0.0669564 | 0.658468 | -0.0528784 | 0.747757 |
| 7642496 | 9 | -528.999 | -778.805 | -125.959 | -0.0669809 | 0.658689 | -0.0529821 | 0.747553 |
| 7642018 | 6 | -150.275 | -872.864 | 530.203 | 0.7208440 | -0.0628786 | -0.6878840 | -0.0569690 |
| 7642019 | 6 | -146.652 | -872.648 | 495.419 | 0.7209990 | -0.0627099 | -0.6877380 | -0.0569590 |
| 7642497 | 9 | -473.592 | -772.865 | -131.356 | -0.0660593 | 0.65033 | -0.0503052 | 5.24375 |
| 7642498 | 9 | -473.999 | -773.021 | -131.288 | -0.0662089 | 0.650459 | -0.0501128 | 0.754989 |
| 7642020 | 6 | -353.595 | -876.233 | -611.145 | 0.7191120 | -0.0591184 | -0.6897900 | -0.0597775 |
| 7642021 | 6 | -306.057 | -876.033 | -660.065 | 0.7192220 | -0.0590758 | -0.6896600 | -0.0599893 |
| 7642499 | 9 | -502.772 | -77.707 | -128.503 | -0.0662261 | 0.65524 | -0.0512622 | 0.750764 |
| 7642500 | 9 | -504.453 | -777.184 | -128.316 | -0.0664396 | 0.655472 | -0.0512363 | 0.750544 |
| 7642022 | 6 | -331.578 | -879.503 | 233.687 | 0.7155560 | -0.0663115 | -0.6932750 | -0.0543330 |
| 7642023 | 6 | -332.032 | -879.784 | 234.095 | 0.7153980 | -0.0662657 | -0.6934340 | -0.0544359 |

FIG.4

| id | sid | epoch | microsec | mwgmt | mask | counter | accx | accy | accz | gyrox | gyroy | gyroz | magx | magy | magz | pressure | temperature | rpyroll | rpypitch | rpyyaw | qq0 | qq1 | qq2 | qq3 |
|---|---|---|---|---|---|---|---|---|---|---|---|---|---|---|---|---|---|---|---|---|---|---|---|---|
| 7641127 | 6 | 1385067492 | 487943 | -60 | 127 | 38559 | 16 | -48 | -20 | 2 | 0 | -1 | 72 | -22 | 1650 | 65499 | 380 | -358.632 | -85.287 | 258.002 | 0.728752 | -0.0768647 | -0.678821 | -0.0470624 |
| 7641548 | 9 | 1385067492 | 494765 | -60 | 127 | 17204 | -108 | -1012 | -48 | 0 | -1 | 0 | -100 | -477 | -110 | 9739 | 350 | -419.469 | -778.711 | -136.735 | -0.0586622 | 0.648119 | -0.0424806 | 0.758087 |
| 7641549 | 9 | 1385067492 | 509953 | -60 | 127 | 17205 | -116 | -992 | -64 | 2 | -1 | 0 | -94 | -469 | -108 | 9739 | 350 | -419.078 | -778.623 | -136.776 | -0.0586449 | 0.648038 | -0.0429288 | 0.758156 |
| 7641129 | 6 | 1385067492 | 512625 | -60 | 127 | 38560 | 36 | -48 | -16 | 2 | 0 | 0 | 75 | -33 | 1656 | 65499 | 380 | -356.961 | -852.654 | 256.172 | 0.728896 | -0.0769527 | -0.678648 | -0.0471686 |
| 7641131 | 6 | 1385067492 | 527847 | -60 | 127 | 38561 | 36 | -60 | -16 | 1 | 1 | -1 | 67 | -38 | 1652 | 65499 | 380 | -357.866 | -852.772 | 257.245 | 0.728821 | -0.07656 | -0.678748 | -0.0470589 |
| 7641550 | 9 | 1385067492 | 534674 | -60 | 127 | 17206 | -120 | -1000 | -48 | 2 | -2 | 0 | -99 | -480 | -96 | 9739 | 350 | -417.002 | -778.737 | -136.969 | -0.0584961 | 0.64792 | -0.0421622 | 0.758288 |
| 7641551 | 9 | 1385067492 | 549808 | -60 | 127 | 17207 | -108 | -984 | -64 | 2 | 2 | 0 | -100 | -474 | -108 | 9738 | 350 | -416.855 | -778.694 | -136.965 | -0.0586206 | 0.647891 | -0.0420628 | 0.758308 |
| 7641133 | 6 | 1385067492 | 552519 | -60 | 127 | 38562 | 20 | -48 | 28 | 3 | 0 | -1 | 75 | -39 | 1656 | 65499 | 380 | -339.185 | -851.764 | 238.496 | 0.729809 | -0.0763701 | -0.677701 | -0.047624 |
| 7641135 | 6 | 1385067492 | 567814 | -60 | 127 | 38563 | 28 | -48 | -24 | 1 | 1 | 1 | 78 | -30 | 1661 | 65498 | 380 | -340.673 | -851.894 | 240.107 | 0.729711 | -0.0763268 | -0.677819 | -0.0475166 |
| 7641552 | 9 | 1385067492 | 574310 | -60 | 127 | 17208 | -124 | -992 | -40 | 1 | 0 | 0 | -92 | -475 | -114 | 9738 | 350 | -415.416 | -778.839 | -137.03 | -0.0589478 | 0.64787 | -0.0414146 | 0.758337 |
| 7641553 | 9 | 1385067492 | 589582 | -60 | 127 | 17209 | 124 | -1016 | -44 | 3 | -1 | -1 | -89 | -480 | -107 | 9738 | 350 | -414.294 | -778.767 | -137.15 | -0.0588154 | 0.647731 | -0.041382 | 0.758467 |
| 7641137 | 6 | 1385067492 | 592444 | -60 | 127 | 38564 | 36 | -36 | -28 | 1 | 1 | 0 | 75 | -31 | 1656 | 65498 | 380 | -345.762 | -852.246 | 245.165 | 5.06527778 | -0.0764687 | -0.678144 | -0.0474148 |
| 7641965 | 6 | 1385067492 | 607686 | -60 | 127 | 38565 | 52 | -76 | -24 | 2 | 0 | -1 | 74 | -36 | 1656 | 65498 | 380 | -346.752 | -852.295 | 246.178 | 0.729351 | -0.0764846 | -0.678198 | -0.0473708 |
| 7641554 | 9 | 1385067492 | 614864 | -60 | 127 | 17210 | -96 | -988 | -64 | 0 | 0 | 0 | -94 | -470 | -103 | 9738 | 350 | -41.968 | -779.021 | -136.595 | -0.0593351 | 0.648341 | -0.0417033 | 0.757888 |

FIG.5

SYSTEM AND METHOD FOR SUPERVISING, MANAGING, AND MONITORING THE STRUCTURAL INTEGRITY OF A FLUID-TRANSPORTATION PIPELINE NETWORK, FOR LOCATING THE LEAKING POINT, AND FOR EVALUATING THE EXTENT OF THE FAILURE

CROSS-REFERENCE TO RELATED APPLICATION(S)

This document is a national phase entry application, claiming the benefit of, and priority through, PCT Application No. PCT/IT2013/000346, filed Dec. 11, 2013, in turn, claiming the benefit of, and priority to Italian Patent Application Serial No. RM2012A00629, filed Dec. 11, 2012, all of which are hereby incorporated by reference in their entirety for all purposes.

TECHNICAL SECTOR

The invention relates to a system for inertial analysis of the movement of the rigid structure of a pipeline network and of the structural behaviour in regard to magnetic/electrical/acoustic stresses, based upon the acquisition of the knowledge of the state of normal operation, aimed at detecting structural damage and phenomena that might jeopardize the integrity thereof through the behavioural analysis of the structure itself employing distributed smart multisensor units and using the structure itself as sensitive element; the system moreover has the capacity of identifying the type of failure and self-limiting the damage.

In particular, the invention regards a system and a method for monitoring and preventive detection of faults and failures due to intrusion of third parties in oil pipelines and gas pipelines.

PRIOR ART

In the current state of the art, many techniques and technologies are used for managing the structural part of a transportation and distribution network based upon pipelines. All these are aimed at preventing any action on the part of external and internal agents that might alter integrity thereof, following upon corrosion, or else the flow rate thereof, following upon incrustations, sediment, or deposits. It is of fundamental importance to identify, within the pipes, the point where a phenomenon of alteration of integrity is occurring, whether this is caused by a natural event or else by an artificial event, either unintentional or wilful, in order to enable an immediate corrective intervention aimed at restoring normal operation.

Currently, all the pipelines carrying liquids and gases are handled through systems of supervision, management, and control by means of which it is possible to observe the situation of the entire network and operate remotely according to the operating needs.

From the document No. U.S. Pat. No. 6,155,292 there is known a system for monitoring and predicting the damage in water mains, which envisages the use of sensors distributed along the pipes for conveying the water.

However, the system described in the document No. U.S. Pat. No. 6,155,292 is devised and can effectively be functional only for water lines, but cannot be applied to the case of oil or gas pipelines because it would not be effective.

In fact, flow in water lines occurs by gravity, whereas in the oil and gas sector the product is moved in the pipe through thrust pumps that produce noise, the frequencies of which would thus cover the ones generated by a leak. The sensors used control the flow rates of the pipe through a flowmeter, whilst the geophones and accelerometers used have the function of controlling the vibrations received within the structure, which would also be hidden by the frequency of the thrust pumps. Ultrasound has the function of detecting the presence of a leak at a limited distance, but also with this technique, applied to oil or gas pipelines, the ultrasound waves would be covered by the noise of the pumps, except in the case of a very extensive leak, which the systems today made available in these sectors are already able to identify.

Furthermore, the systems devised for water lines do not tackle or solve the problem of recording pre-alarms regarding intrusion on the part of third parties, a phenomenon that is instead extremely acutely felt and recurrent in the case of oil pipelines and gas pipelines.

PURPOSE OF THE INVENTION

The purpose of the present invention is to overcome the drawbacks of the solutions already known and propose a system and a method for preventive monitoring of faults and failures in networks of oil pipelines and gas pipelines, said system and method operating in real time and being able to ensure round-the-clock monitoring of the entire network, identification of the geo-located point that is at the origin of the fault, identification of the type and cause of the damage to structural integrity, and calculation of the extent of any possible leak.

In particular, forming a specific purpose of the invention is a system and a method that enables automatic identification both of possible leakages due to attempts of non-authorized perforation and of the point where the leak is occurring, and moreover immediate notification to the operators by displaying in a geo-referenced way the exact location of the attempt of attack.

SUMMARY OF THE INVENTION

The above purposes have been achieved by providing a system and a method according to at least one of the annexed claims.

The main advantage of the invention lies in the fact that the automatic and distributed sensing and notification system according to the invention supplies to the operators of the gas/oil pipeline an alarm in real time of fraudulent attempts of perforation or digging in the vicinity of the pipeline and hence enables timely reaction to the intrusion to prevent damage to the structure and the consequent costs for repair and maintenance.

Further advantages of the invention lie in a greater safety of the system, in the reduction of the amount of damage to the pipelines and of the corresponding costs, shorter downtimes of the system and of product supplies, improvement of the tools of communication between operators of the system and managers of the distribution network, and longer service life of the structure.

LIST OF THE DRAWINGS

The above and further advantages will be more readily understood by any person skilled in the branch from the ensuing description and from the annexed drawings, which are provided by way of non-limiting example and in which:

FIG. 1 is a schematic illustration of a system according to the invention;

FIG. 1a reproduces the cross section a-a of FIG. 1;

Figure 1:
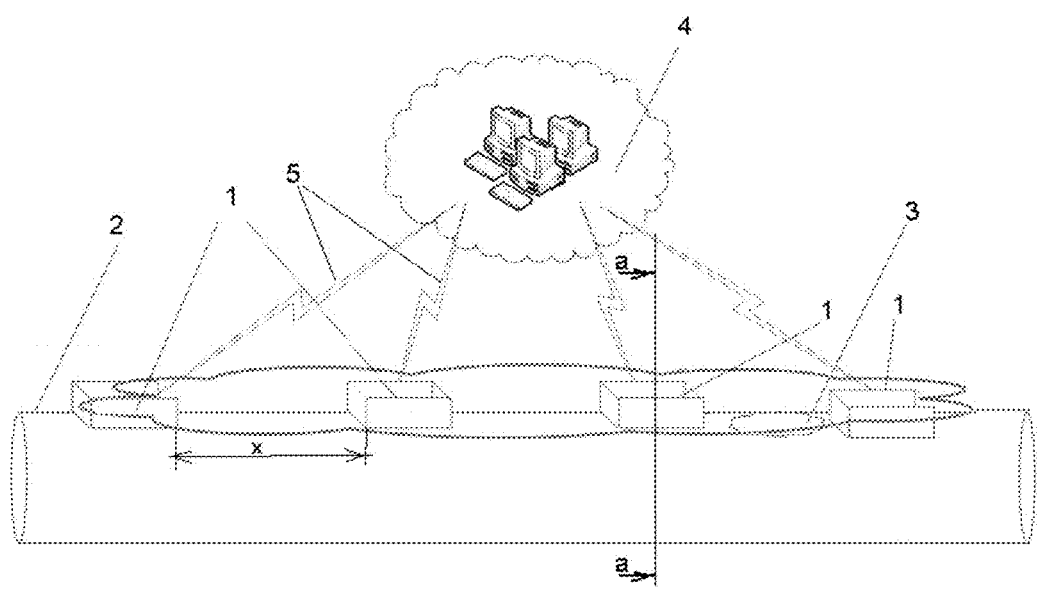
Figure 1A:
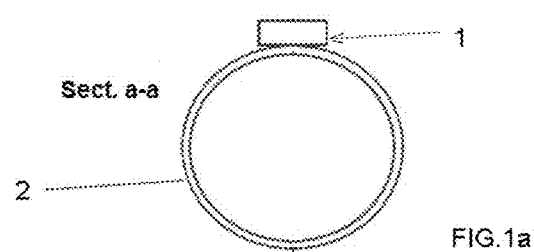
Figure 2:
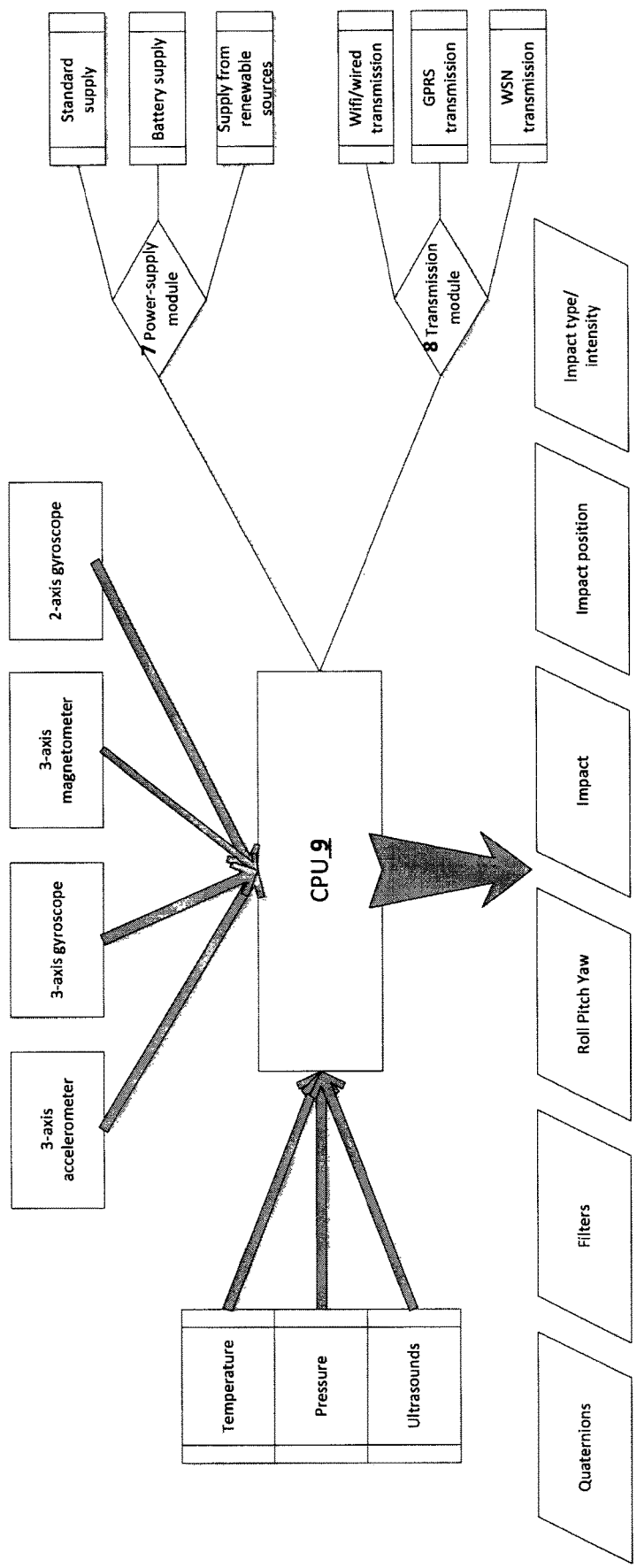
FIG. 2 shows a functional diagram of a detection unit according to the invention.

FIG. 4 shows a table of the values of variation in time of the angles (rpyroll, rpypitch, rpyyaw) and of the three-dimensional vector displacements (qq0-qq3) detected in a plurality of points for each sensor, said points being recorded sequentially within a data base with sequential index (ID) by corresponding detection units of the system following upon an impact suffered by the structure monitored; and FIG. 5 shows an example of a multi-dimensional sampling carried out on a section of line/pipe.

DETAILED DESCRIPTION

With reference to the annexed drawings, a system according to the invention is described.

The system constitutes an integrated telemetering and control system for acquisition and inertial analysis of the movement of a rigid structure and of the behaviour thereof when it is subjected to stresses/leakages (whether accidental or not). The measurements are made through the positioning and use of smart multisensor transducers 1 (vibrations, images, variations of electromagnetic fields, perturbations, perception of the environment, microwaves, ultrasound waves) controlled by a microprocessor, fixedly installed on the structure 2 that is to be checked.

In the present description, by "transducers", "state detectors", or "sensors" are to be understood devices capable of detecting multidimensional physical quantities of any type (of a thermal, light, magnetic, mechanical, chemical nature, etc.) and of converting them into a quantity of some other type, generally electrical (voltage or current) or encoded digital information.

By interpreting the magnetic/electrical/acoustic measurements, obtained using the various transducers 1, the state of normal operation of the structure 2 is determined, as well as any possible faults or alterations thereof, the aim being to identify any damage or leakage of the structure that might jeopardize proper operation and integrity thereof. By transmitting, through a multisystem/multichannel communication (of a GSM, WiFi, wired type, etc.), the information detected by the transducers fixedly installed on the structure being controlled, this structure is able to carry out detection of the area even if an intermediate apparatus is not functioning. This capacity is guaranteed by a mesh of sensors, i.e., a network of sensors of the WSN (wireless sensor network) type, and apparatuses through a number of modalities of communication implemented simultaneously on one and the same apparatus/transducer 1.

The inventive step lies in the application of the aforementioned apparatus/transducer 1 on a fixed/static pipeline or structure 2 for control, monitoring, and management thereof and in the determination/identification of the alterations/damage/leakages of the pipeline/structure 2.

The system further comprises a central system 4, which develops the analysis of the signals that highlight the faults/leakages, perceived by the system as alteration of the mean reference values.

The central system 4 functions through dimensional thresholdings for each individual measurement, through which it perceives the changes of state, thus bringing into effect an experiential learning based upon what is perceived by the individual sensors and apparatuses distributed along the pipeline 2. Through experiential learning, there are promptly identified the changes, with respect to the known state, of the state detected of the entire structure controlled by the central system 4, thus providing a new integrated system of control of the pipeline 2 and of detection of any alteration, fault, or leak 3.

Analysis of the data, by post-processing performed in the central system 4, for creation of experiential models that regard a stretch of pipe or the entire pipeline 2 is carried out so as to determine functional filters and the associated running date and time for the entire system for each measurement and detection unit applied.

The above capacity applied to the system enables reading and interpretation of the information received through re-processing of the various measurements made by all the transducers in near real time so as to control constantly the structure/pipeline 2, defining a new and innovative methodology of continuous and constant control of the fixed structures, and in the specific case of pipelines enabling round-the-clock monitoring thereof.

Through the interpretation of the aforementioned experiential learning there are defined and identified any possible deviations from the state of rest and/or any overstepping of the limit thresholds set for the individual stretches or for the pipeline as a whole, thus enabling highlighting of an alteration/fault/leak 3.

The system is devised for providing a dynamic display or functional panel for the aforementioned transducers, through which it is possible to monitor the overall operation and the point-by-point operation of each of the individual apparatuses applied to the pipeline 2, the faults/leakages perceived by the transducers, and their georeferencing so as to have a parallel system of control of the sensor system applied to the pipeline and of the events detected thereby, enabling definition of a number of degrees of seriousness and of primary interventions for ensuring proper operation of the individual distributed apparatuses making up the system.

The innovative idea envisages the creation of a real-time system that is able to:

monitor the entire network all round the clock;

detect the geo-located point of origin of the fault or failure;

identify in what way structural integrity is jeopardized and the cause lying behind the fault; and calculate the extent of the possible leak 3.

The system according to the invention is consequently based upon real-time analysis of behavioural models deriving from acquisition of the data regarding the entire pipeline 2 being controlled and from a basic knowledge acquired, the acquisition being made through a network of state transducers installed on the pipeline 2 itself.

Furthermore, the system considers the set of data, always referenced in time, as photograms; it carries out comparative analyses, aimed at masking background noise or recurrent noise, due to natural phenomena, such as wind, birds, impact of animals, passage of herds and flocks over the surface, rain, etc., or to routine human activities, or to operation of systems of thrust, such as pumps, and solenoid valves, and to maintenance activities.

Thanks to the invention, both through an analysis of applied models and through the network of multidimensional state detectors, the system can consequently identify when the limits set are overstepped or situations arise that, according to pre-set rules, may be considered potentially dangerous, and generates a pre-alarm in the case of detection of an anomalous situation that has not been identified; in the case where the situation is identified with certainty, it generates an immediate alarm.

Advantageously, the system 4 is able to:

display, dynamically and in real time, the entire situation regarding what is happening along the pipeline 2 with an indication of where, who, and what is generating the state or condition of the information represented;

notify immediately, through the communication means provided, the entire structural organizational chain envisaged; and make immediately available the position data for locating the point where a specific phenomenon of perforation, and/or leak 3 is taking place.

Supervision, management, and control can be implemented through a control centre, which may be duplicated, for reasons of safety, in terms of broad-area centres, medium-area centres, and local centres.

In the event of emergency, each structure can assume control and take over any level of hierarchical control, irrespective of the geographical location.

Finally, since the system is based upon real-time acquisition of information coming from the number of transducers applied, a powerful monitoring tool will be available capable of providing indications on the state of integrity of the entire pipeline 2, enabling detection of any structural alterations.

Advantageously, the system according to the invention offers an effective solution for preventing leakages and/or for preventing any wilful perforation of the pipelines in order to draw off the product conveyed thereby.

The system described in fact enables automatic identification of a leak 3 due to an attempt at perforation, as well as location of the point where said attempt is being made, immediately warning the operators and displaying in a geo-referenced way the exact location of the attempt of attack.

In greater detail, the system for detection of the leaks and for protection against perforation of the pipelines is articulated in two sub-systems:

supervision and management, which enables monitoring of the entire pipeline 2 controlled through dynamic graphic representations; and detection of the attempts of attack (third-party intrusion), or an unauthorized excavation which may accidentally cause failure of the pipeline 2 or damage it, this sub-system managing the entire set of transducers installed in field and supplying the information to the supervision and management system.

To carry out integrated monitoring of the pipeline 2, the system is based upon an integrated telemetering system for acquisition and analysis of various sources of information, vibrations, images, variations in electromagnetic fields, disturbance, perception of the environment, microwaves, ultrasound waves, etc., using behavioural models for the interpretation and detection of the image of reality acquired so as to detect any anomalous behaviour, identify it and, if necessary, intervene to repair any possible damage.

Preferably, the architecture of the system is based upon a cell structure, where each unit 1 constitutes a cell that is able to set up a multiple communication towards the nearest unit. In this way, the communication network is made up of the units 1 themselves, and no other network structure is necessary.

According to the invention, and with reference to the figures, the units 1 are provided in the form of state-detection units to be distributed in field, fixed with respect to the pipeline, through which the system 4 perceives the environmental variations, by means of multidimensional transducers. There is then provided a co-ordination and processing module for facilitating the central system in receiving data, and an autonomous supply module capable of diversified management of energy sources according to the context in which the new multidimensional state-detection unit is installed.

Advantageously, the communication module used enables communication both through wired network, whether copper or fibre, and through wireless network, as well as through the use of the pipe itself as communication medium.

Everything that moves generates modifications in the surrounding environment. In nature, animals are alerted by the presence of a danger as they detect the difference between the previous condition, classified as normal, and the change that has arisen; in a jungle full of noises, sudden silence is a clear signal of alarm, as likewise a noise different from the normal situation is to be considered certainly a signal indicating a probable threat.

The system in question is based precisely upon the capacity of listening to and perceiving the environment, through the behavioural analysis regarding the various specific contexts, on the basis of the information introduced previously and of the experience acquired, enabling acquisition of anomalous situations identifying the origin and causes thereof.

Since the system has a basic reference model, upon initial turning-on thereof it is also able to identify possible faults; this means that it is possible to represent graphically a map of the pipeline 2 with the indications of the faults found.

Detection of the information regarding the environment is carried out through latest-generation state detectors, duly designed in order to enable analysis of complex sensor images, constructed on the basis of the information coming from the pipeline 2.

The "sensory faculties" of the system are obviously adequate for the context and the habitat in which they have to operate: like fish that live in the deep sea, or moles that live underground, the system is able to listen to the vital signals of the pipeline 2 through transducers, which are capable of detecting different quantities by providing multidimensional state-detection units that are able to detect a number of dimensions and physical quantities simultaneously.

Figure 3A:
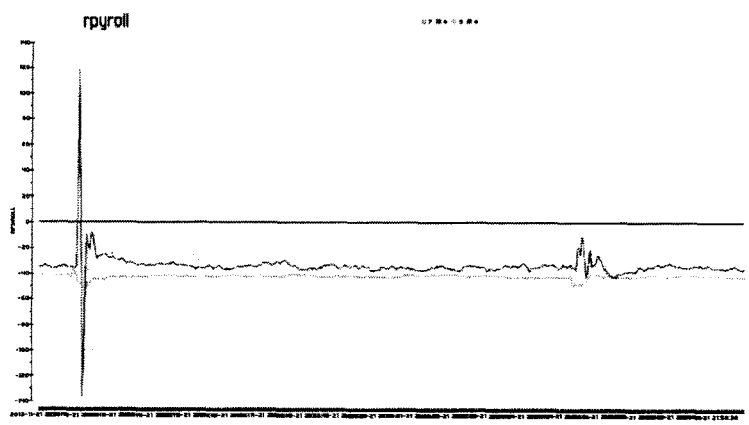
FIGS. 3a-3d represent, respectively, an example of detection of the variations in time of the angle of roll (rpyroll), of pitch (rpypitch), and of yaw (rpyyaw), as well as of the value of a three-dimensional vector displacement (qq2) processed on the basis of the detections made by the sensors of a detection unit of the system following upon an impact suffered by the structure monitored.
Figure 3B:
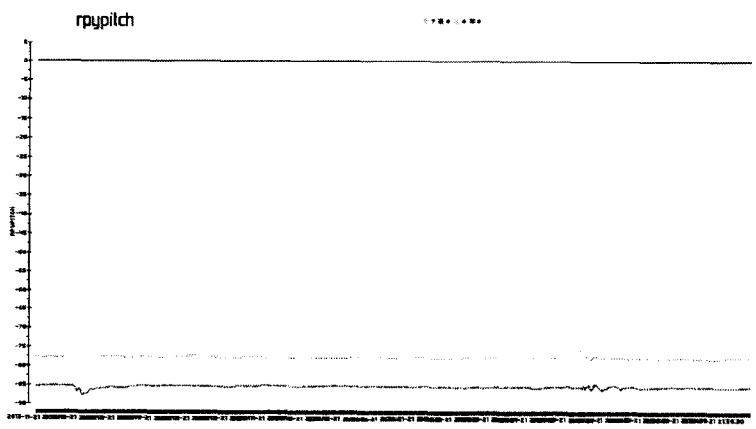
Figure 3C:
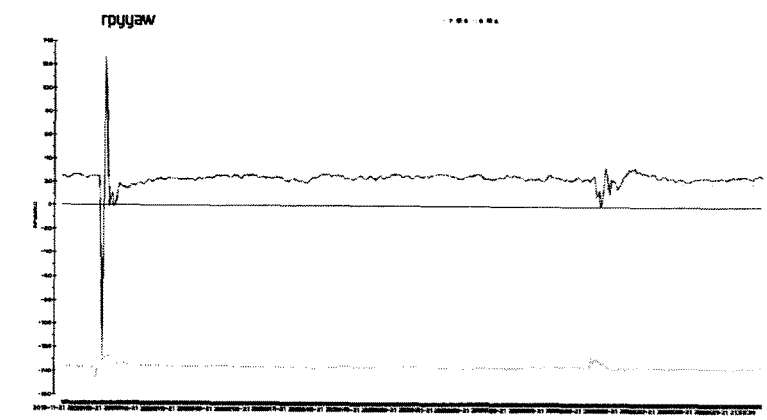
Figure 3D:
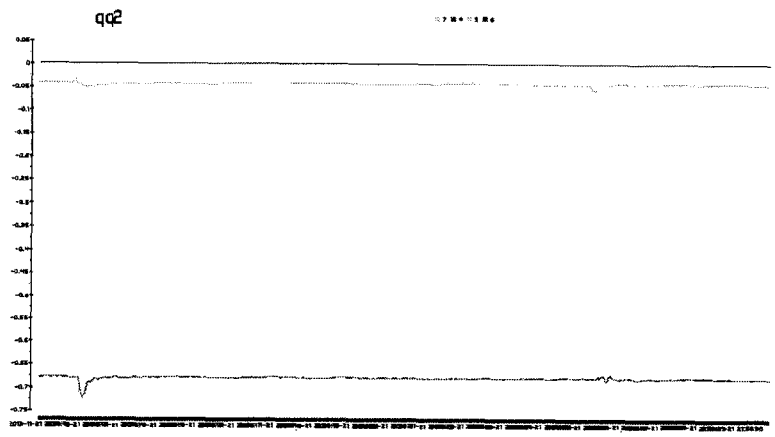

FIGS. 3a-3d provide an example of detection of the variations in time of the angle of roll (rpyroll), pitch (rpypitch), yaw (rpyyaw), and the value of a displacement (qq2) detected by a detection unit of the system following upon impact undergone by the structure monitored, whereas FIG. 4 presents a table of the values of variation in time of the angles (rpyroll, rpypitch, rpyyaw) and of the three-dimensional vector displacements (qq0-qq3) detected in a plurality of points, for each sensor, recorded sequentially within a data base with sequential index (ID) by corresponding detection units of the system following upon an impact undergone by the structure being monitored.

The curves appearing in the figures highlight the event of the impact in the various operations of merging of the data deriving from the basic measurements of the sensors. The horizontal axis (axis x) of the graphs always represents the time axis; appearing on the other axis are the measurements of the aggregate functions of the elementary sensors. Appearing on the vertical axis are the degrees for yaw, pitch, and roll and the number of the aggregate measurements for the quaternions QQ0, QQ1, QQ2, QQ3 used for calculating the position of the points in space and resulting from processing of the data detected by the sensors.

Furthermore, the units 1 are able to generate electromagnetic frequencies ranging from nanometres to metres (frequencies, microwaves, vibrations, ultrasound waves), according to a specific programming or if required by the central system 4.

Thanks to the above characteristic, through said units 1 it is possible to acquire all the data necessary for behavioural analysis of the system of pipelines, also using already known sources, such as injection of a signal with a predefined magnitude, and it is possible, through detection of this signal both by the units that are close to the emitter unit and by the emitter unit itself, to analyse the reflection, distortion, and attenuation and, on the basis of these analyses, determine with greater ease and correctness the situation of a pipeline 2 upon initial turning-on.

It could prove difficult to determine a normal behavioural model in a stretch of pipe already perforated in so far as, on the basis of the environmental experience, the system would find as part of normality the environmental noise produced by the leak 3.

Instead, if the system is able to introduce standard signals of its own, it may be able to detect any possible damage and any possible leaks using also currently available techniques.

The state-detection units provided are fixed with respect to the pipeline 2 and are contained in purposely provided mechanically solid containers; all the electronics is able to withstand violent impact without suffering damage.

Each structure, not fixed with respect to the pipe, is equipped with additional transducers that detect the presence of persons and machines in the proximity of the structures and generate a pre-alarm.

Supply systems in the form of autonomous units for producing electrical energy are present, which are systems that do not have to be supplied manually but that exploit the environmental characteristics for generating energy and enable exploitation of non-conventional energy sources such as solar radiation, thermal differences, and vibrations.

The systems are all designed to be units of one and the same power-supply network.

For detection of a leak 3 due to accidental or voluntary perforation a possible solution has been devised, considering the critical nature of the context in which it will have to be rendered operative.

According to an advantageous aspect of the invention, the technical solution adopted makes use of mature technologies, bearing in mind the difficulty of installation and the costs, both costs of implementation and running costs, and stems from the consideration that the pipelines 2 are made of metal material, which is an excellent conductor of vibrations, and enables a network of multidimensional and multifunctional state-detection units to be created, installed along the entire pipeline 2 so as to detect any sort of mechanical and electromagnetic vibration.

Through an analysis of the aforesaid vibrations and considering the various changes of state of all the measurements considered, it is thus possible to identify an attempt at attack or third-party intrusion and, since the transducers are fixed reference points along a straight line, it is not difficult to trace the point where there is an attempt to carry out a wilful attack on the pipeline 2.

Thus, an appropriate number "n" of autonomous peripheral units 1, which are able to communicate and function themselves as network, can be installed along the entire pipeline 2, enabling the entire network to be kept under control not only as regards attacks, but also as regards failures or problems detectable through analysis of the electromagnetic vibrations.

The solution according to the invention is devised for being positioned at longer distances apart and for controlling all the inertial movements of the line 2, including any possible millimetric displacements along the axes of the structure or a section thereof.

The sensors used, in fact, are sensors of an avionic/aeronautic origin devised for the specific control of aircraft. They are used both to determine the position in three-dimensional space and to correct the position through complex feedback information, resulting from a comparison between the predetermined position and the actual position detected at a given instant.

In greater detail, the units 1 are complex smart sensors made up of elementary basic sensors, such as:
triaxial accelerometers;
triaxial gyroscopes; and
triaxial magnetometers,
that provide the processing units 9 of each unit 1 with the elementary information that, in a logic of data merging through an algorithm based upon mathematical logics of the "quaternion" type, are processed by the CPU 9, which correlates them, enabling, also thanks to the use of MEMS technology, detection of micro-movements in a three-dimensional space.

In processing of the data, also extended Kalman filters are adopted so as to raise the degree of precision of the resulting quantities processed.

The unit 1 may contain other elementary sensors, such as:
a high-precision pressure meter (altimetric detection with a precision of 10-30 cm);
a device for measuring the temperature detected within the smart sensor; and
an ultrasound receiver for detection of the speed of propagation of a sound in order to determine the type of material constituting the elements of the pipeline.

According to the invention, all these elementary sensors have the function, not of supplying direct measurements for detection of any fault, but rather of supplying corrective values, which are then to be converted into mathematical variables aimed at correction of the fundamental quantities measured, in so far as they have the function of perceiving the variations that depend upon the habitat where the section of pipeline has been laid and rendered operative.

Another important characteristic is that the units 1 are applied at a distance comprised between 1 and 5 km according to the resolution and the performance that is sought and in order to rationalize the application over structures having a length of even thousands of kilometres.

The system proposed herein is based upon behavioural models acquired through an expert system aimed at self-learning, based upon the temporal information acquired, organized in a structured and articulated database and obeying predetermined rules defined by persons skilled in the sector.

The communication structure internal to the smart sensor has modular characteristics and is based upon a common bus for transmission and interconnection of different communication modules so as to guarantee communication in critical environments even using a number of transmission modes, from fibre optics to wireless communication. The mesh configuration enables the existence of a redundant network in which each detection unit communicates and can stand in for another non-functioning unit, by re-routing the information, in a logic of meshed wide-area network.

Both the communication modules and the power-supply module form part of the smart sensor, and hence are contained in the same mechanical structure that has to be applied fixedly to the pipe using two modalities. The first uses a metal band, which, like a ring laid on the pipe, blocks the mechanical part of the smart sensor provided, following the curvature of the section of the pipeline; the second modality uses the same mechanical structure bolted to the pipeline where possible. In all cases, maximum care must always be taken to ensure that the mechanical part adheres to the pipeline and is fixed with respect thereto for the purposes of transmission of movement.

In operation, the system works as follows:

it acquires via the units 1 the data deriving from the momentary modifications (for example, rotations, displacements, accelerations, variations in temperature or pressure) that are induced by the environment on the rigid bodies constituted by the pipelines, and that regard a given phenomenon of perturbation (for example, third-party intrusion, digging in the vicinity, collapse), with respect to the normal operating conditions, at the given instant;

it correlates the data acquired through the network of sensors, using a database deriving from the experience acquired for that specific installation obtained from said re-aggregated information and through behavioural models;

it analyses the movements detected from every standpoint in order to determine which movement falls within the parameters of normality, identifies the significant variation, generated or induced, and photographs the sets divided into minimal significant information quanta, located on the time axis of a repetitive cycle; and it identifies the type of fault, and the anomalous situations that could jeopardize the functionality and structural integrity of the installation being checked, enabling intervention in order to prevent or limit damage.

Then, automatically:

it generates an alarm;

it identifies the geo-located point of origin of the failure also in terms of physical position with respect to the sensor nearest to the point of origin;

it identifies the type and cause of the impaired structural integrity;

it displays, dynamically and in real time, the entire situation regarding what is happening along the pipeline, with indication of where, who, and what is generating the state of the condition of the information represented;

it informs immediately, through the communication means provided, the entire structural organizational chain envisaged; and it renders immediately available the position data for locating the point where a specific phenomenon is happening.

In a preferred embodiment, the units 1 are equipped with sensors for detecting linear and angular accelerations, magnetic fields, variations in temperature, pressure variations, and ultrasound waves, which present these technical characteristics:

microprocessor: 16-32 bits;

triaxial accelerometer: ±2 g, ±4 g, ±8 g, ±16 g programmable linear acceleration;

triaxial magnetometer: from ±1.3 gauss to ±8.1 gauss;

triaxial gyroscope (roll, pitch, yaw): 16-bit data output, ±250°/s, ±500°/s, ±2000°/s selectable;

flexible interface: CAN, USART, SPI and I2C serial interface; USB 2.0;

8 ADC channels for external inputs;

pressure sensor: this is an ultra-compact absolute piezoresistive sensor, which comprises a monolithic sensitive element and an IC interface capable of fetching information from the sensor and supplying a digital signal to the outside world; absolute pressure range: 260-1260 mbar; high-resolution mode: 0.020 mbar RMS;

temperature sensor: this is a digital sensor that communicates via two SMBus-2.0-compatible wires; the temperature is measured with a resolution that can be configured by the user between 9 and 12 bits: on 9 bits the smallest step size is 0.5° C.; on 12 bits it is 0.0625° C.; at the predefined resolution (10 bits, 0.25° C./LSB), the conversion time is nominally 21 ms; operating temperature: from −40° C. to +125° C.; and extremely low energy absorption both to respect energy efficiency and to guarantee an extremely low maintenance level on the power-supply line.

The present invention has been described according to preferred embodiments, but equivalent variants may be devised, without thereby departing from the sphere of protection granted.

The invention claimed is:

1. A system for supervising, managing, and monitoring the structural integrity of a network of metal pipelines for transporting a fluid, for detecting attempts of third-party intrusion of the pipelines, for locating a leaking point in the pipelines, and for evaluating faults or failures in the pipelines, comprising:

a plurality of detection units (1) positioned on an exterior of a pipeline (2), positioned at a distance apart from one another and fixedly applied to the pipeline (2);

a central data-processing unit (4), connected by means of communication lines (5) to the detection units (1) for receiving detection data from the detection units (1); and means for alarm and automatic notification that activate responsive to a detection of a fault at a detection unit of said detection units, wherein the detection units (1) each comprise a container (6), fixedly applied to the pipeline (2), and a plurality of sensors housed within the container (6) and configured for detecting and measuring, with respect to predetermined reference thresholds, linear and angular accelerations, wherein each one of the detection units (1) comprise a communication module (8) for communication between other ones of the detection units (1) and with the central data-processing unit (4), wherein said detection units (1) each comprise a peripheral processing unit (9) in communication with said sensors and said communication module, wherein said detection units (1) communicate with one another according to a network architecture, wherein each detection unit of the detection units (1) is configured to detect variations of speed and variations of orientation by way of said measurements of linear and angular accelerations to which the detection unit is subjected at a location along the pipeline at which the detection unit is fixed, so as to monitor and transmit as said detection data time—referenced variations of angle of roll, of angle of pitch, and of angle of yaw of the pipeline at said location, wherein the detection data provided by each detection unit (1) to the central data-processing unit (4) comprises a time corresponding to each measurement occurring at the detection unit (1), wherein said central data-processing unit (4) processes, in real time, the detection data received from the detection units (1), including taking into account the time corresponding to each measurement, in order to detect anomalous behaviour of the pipeline, wherein said central data-processing unit (4) comprises a supervision and management sub-system configured to monitor the detection data received from the detection units of an entirety of the pipeline (2), controlled through dynamic graphic representations, wherein said central data-processing unit (4) also comprises a sub-system for detecting from the detection data non-authorized attempts of attack or impact that might break or damage the pipeline (2), which is associated to the plurality of detection units (1) and supplies information detected to the supervision and management sub-system, and wherein the central processing unit (4) is configured to:
  determine occurrence of state changes with respect to a state of normal operation of the pipeline (2) through dimensional thresholding for each individual measurement carried out by the detection units (1),
  implement experimental learning based on the detection data received from the detection units (1) distributed along the pipeline (2) so as to identify occurrence of state changes with respect to the state of normal operation of the pipeline (2), and
  generate experiential models regarding at least a portion of the pipeline (2) by performing real-time post-processing of the detection data, so as to determine functional filters and associated running dates and times for each measurement and detection unit (1).

2. The system according to claim 1, wherein at least one part of the sensors of said detection units (1) of the system form a redundant-mesh network of a wireless-sensor-network (WSN) type, in which each detection unit communicates and in which each detection unit can stand in for non-functioning ones of said detection units.

3. The system according to claim 1, wherein said network architecture of the system is based upon a cell structure, wherein each detection unit (1) constitutes a cell configured to set up a multiple communication towards a nearest one of the detection units.

4. The system according to claim 1, wherein the detection units (1) each comprise:
  an electronic co-ordination and processing module that assists the central data-processing unit (4) in reception of the detection data;
  an autonomous supply module (7) that manages diversified energy sources according to a context in which the detection unit (1) is installed; and
  a communication module (8) that is configured to communicate through any of wired networks, wireless networks, and via the pipe itself as a communication medium.

5. The system according to claim 1, wherein the detection units (1) include means for generating electromagnetic frequencies ranging from nanometres to metres according to a specific programming or if required by the central data-processing unit (4).

6. The system according to claim 1, further comprising:
  additional transducers not constrained to the pipeline (2), which are configured to detect a presence of persons and machines in a proximity of structures of the pipeline and to generate a pre-alarm in the event of a detection of said presence.

7. The system according to claim 1, wherein said detection units (1) comprise:
  a triaxial accelerometer;
  a triaxial magnetometer;
  a triaxial gyroscope;
  a flexible interface;
  a plurality of channels for external inputs;
  a piezoresistive absolute-pressure sensor with a resolution of less than 0.05 mbar, and a range of application of 200-1500 mbar, of absolute pressure;
  a digital temperature sensor with a resolution configurable between 1° C. and 0.05° C., and an operating temperature of from −50° C. to +150°; and
  an ultrasound receiver for detection of the speed of propagation of a sound detected in order to determine the type of the material constituting the elements of the pipeline (2).

8. The system according to claim 1, wherein said containers (6) are metal containers stably fixed to the pipeline (2), by means of a metal band that blocks the detection unit (1) following a curvature of a section of the pipeline.

9. The system according to claim 1, wherein said detection units (1) comprise:
  a triaxial accelerometer;
  a triaxial magnetometer;
  a triaxial gyroscope;
  a flexible interface;
  a plurality of channels for external inputs;
  a piezoresistive absolute-pressure sensor with a resolution of less than 0.02 mbar, and a range of application of 260-1260 mbar, of absolute pressure;
  a digital temperature sensor with a resolution configurable between 0.5° C. and 0.0625° C., and an operating temperature of from −40° C. to +125° C.; and
  an ultrasound receiver for detection of the speed of propagation of a sound detected in order to determine the type of the material constituting the elements of the pipeline (2).

10. The system according to claim 1, wherein said sensors of said detection units (1) are further configured for detecting and measuring magnetic fields and variations in temperature, pressure variations, and ultrasound waves.

11. The system according to claim 1, wherein the detection units (1) are placed along the pipeline at a distance apart from one another of between 1 and 5 km.

12. The system according to claim 1, wherein each detection unit of said detection units (1) is further configured to function as an emitter unit that injects a signal with a predefined magnitude and detects an injected signal injected by the detection unit or another detection unit, said detection units configured to analyze any of a reflection, distortion, and attenuation of said injected signal, and determine a condition of the pipeline.

13. A method for supervising, managing, and monitoring a structural integrity of a metal pipeline for conveying a fluid, for locating a leaking point of the pipeline and for evaluating faults and failures of the pipeline, carried out by a system that includes a plurality of detection units (1)

fixedly applied on an exterior of a pipeline (2) at a given distance apart from one another, and a central data-processing unit (4) connected by means of communication lines (5) to said detection units (1) for receiving detection data from said detection units (1), the detection units (1) each having a communication module (8) and sensors that measure, with respect to reference thresholds, quantities comprising linear and angular accelerations as detection data including time of detection and transmitted to the central data-processing unit (4), said quantities being detected outside a section of passage of the fluid conveyed, the method comprising:

acquiring said detection data in conditions of normal operation for acquiring a knowledge of a state of normal operation of the pipeline (2);

processing said detection data to determine mean values of all the quantities through dimensional thresholdings for each individual measurement in order to determine occurrence of state changes with respect to the state of normal operation of the pipeline (2);

implementing experimental learning based on the detection data received from the detection units (1) distributed along the pipeline (2) so as to promptly identify the occurrence of state changes with respect to the state of normal operation of the pipeline (2);

generating experiential models regarding a stretch of the pipeline or an entirety of the pipeline (2) by performing real-time post-processing of the detection data, so as to determine functional filters and associated running dates and times for each measurement and detection unit (1);

applying the functional filters to the detection data, evaluating an intensity of the measurement or measurements detected, determining a fault associated with the intensity, and carrying out a behavioural analysis of the pipeline; and recognizing any anomalous behaviour of the pipeline and recognizing the fault, and locating a point of detection of an event that generated the fault.

14. The method according to claim 13, further comprising:

self-checking the system.

15. The method according to claim 13, wherein the detection units (1) are placed along the pipeline at a distance apart from one another of between 1 and 5 km.

\* \* \* \* \*